(12) United States Patent
Soliman

(10) Patent No.: US 9,669,655 B1
(45) Date of Patent: Jun. 6, 2017

(54) WHEEL COVER ASSEMBLY

(71) Applicant: Alaaeldin Soliman, Holmdel, NJ (US)

(72) Inventor: Alaaeldin Soliman, Holmdel, NJ (US)

( * ) Notice: Subject to any disclaimer, the term of this patent is extended or adjusted under 35 U.S.C. 154(b) by 0 days.

(21) Appl. No.: 15/244,746

(22) Filed: Aug. 23, 2016

(51) Int. Cl.
*B60B 7/10* (2006.01)
*B60B 7/04* (2006.01)
*B60B 33/00* (2006.01)

(52) U.S. Cl.
CPC ............... *B60B 7/10* (2013.01); *B60B 7/04* (2013.01); *B60B 33/0028* (2013.01); *B60B 2200/20* (2013.01); *B60B 2200/22* (2013.01); *B60B 2200/24* (2013.01); *B60B 2200/242* (2013.01); *B60B 2200/26* (2013.01); *B60B 2900/551* (2013.01); *Y10T 16/216* (2015.01)

(58) Field of Classification Search
CPC Y10T 16/216; B60B 7/10; B60B 7/04; B60B 33/0028; B60B 2200/20; B60B 2200/22; B60B 2200/24; B60B 2200/242; B60B 2200/26; B60B 2900/551; B60B 33/00; B60B 33/001
USPC ........................................................ 16/18 CG
See application file for complete search history.

(56) References Cited

U.S. PATENT DOCUMENTS

| 2,471,958 | A | * | 5/1949 | Humphreys | ............ B60B 33/00 16/18 CG |
| 2,483,241 | A | * | 9/1949 | Shepherd | ................ B60B 33/00 16/18 CG |
| 4,457,045 | A | * | 7/1984 | Kegg | .................. B60B 33/0042 16/18 A |
| 4,700,430 | A | * | 10/1987 | Raftery | .................. A47B 91/06 16/18 CG |
| 4,800,617 | A | * | 1/1989 | Yeh | ..................... B60B 33/0089 16/18 CG |
| 5,001,808 | A | * | 3/1991 | Chung | .................... B60B 33/06 16/18 CG |
| 5,371,920 | A | * | 12/1994 | Rainville | ................ B60B 33/00 128/203.12 |
| 5,873,144 | A | * | 2/1999 | Tupper | ..................... B60B 7/02 16/18 CG |
| 8,484,801 | B2 | * | 7/2013 | Li | ............................ B60B 7/02 16/18 CG |
| 2004/0088821 | A1 | * | 5/2004 | Imperato | .............. A47C 19/024 16/18 CG |

* cited by examiner

*Primary Examiner* — William Miller
(74) *Attorney, Agent, or Firm* — Rahman LLC

(57) ABSTRACT

A wheel cover assembly includes a wheel housing configured to house a wheel mechanism; a neck portion upwardly extending from the wheel housing, wherein the neck portion includes a hollow channel that extends into the wheel housing; a pair of clips configured on the neck portion; and a lip portion extending from a lower portion of the wheel housing. The wheel housing includes a first half wheel cover; a second half wheel cover; and a plurality of tabs connected to each of the first half wheel cover and the second half wheel cover, wherein the plurality of tabs selectively align together upon connection of the first half wheel cover with the second half wheel cover.

20 Claims, 14 Drawing Sheets

WHEEL COVER ASSEMBLY

BACKGROUND

Technical Field

The embodiments herein generally relate to wheel accessories, and more particularly to wheel covers.

Description of the Related Art

Wheels connected on chairs, shelves, racks, beds, tables, and other moveable objects are often impeded by cords, wires, or other similar obstacles. Sometimes the wheels, such as caster wheels, can roll over these obstacles, but often time the obstacles drag along or become entangled with the wheels. While it would be desirable to simply remove any obstacles from the path that the wheels/objects take along a particular route, this may not be practical in all circumstances. For example, in hospital settings, beds or gurneys almost always have wheels to allow for easy mobility of patients from room-to-room. However, hospital rooms are replete with cords and wires emanating from various types of diagnostic machines. When beds are being moved, they often come into contact with these cords and wires, which can cause damage to the cords, wires, or the diagnostic machines themselves, and which results in a very expensive repair/replacement. Accordingly, it is desirable to create an assembly that permits wheels to flow freely even in the presence of obstacles from cords and wires, etc., and which can be easily assembled and attached and detached to pre-existing and separately manufactured wheels.

SUMMARY

In view of the foregoing, an embodiment herein provides a wheel cover assembly comprising a wheel housing configured to house a wheel mechanism; a neck portion upwardly extending from the wheel housing, wherein the neck portion comprises a hollow channel that extends into the wheel housing; a pair of clips configured on the neck portion; and a lip portion extending from a lower portion of the wheel housing. The wheel housing comprises a first half wheel cover; a second half wheel cover; and a plurality of tabs connected to each of the first half wheel cover and the second half wheel cover, wherein the plurality of tabs selectively align together upon connection of the first half wheel cover with the second half wheel cover. Each of the first half wheel cover and the second half wheel cover comprise one half of the neck portion, wherein each half of the neck portion comprises a clip; a stop configured at an end of the clip; and a catch configured to engage the stop, wherein upon connection of the first half wheel cover with the second half wheel cover, the each half of the neck portion aligns and locks together to form the neck portion comprising the hollow channel, wherein engagement of the catch with the stop locks the neck portion and the wheel housing.

The hollow channel of the neck portion may be configured to permit a wheel stem of the wheel mechanism to extend therethrough. The neck portion may comprise a lock configured to retain the neck portion against the wheel stem. The lip portion may comprise a bottom surface that rests against an underlying surface. In one embodiment, the lip portion may be spaced apart from an underlying surface. The wheel housing comprises a lower portion connected to the lip portion; a middle portion connected to the lower portion; and an upper portion connected to the middle portion and the neck portion. The neck portion comprises an inner neck wall configured to define the thickness of the hollow channel; and an outer neck wall, wherein the pair of clips extend from the outer neck wall. A first side of the outer neck wall comprises a first height, wherein a second side of the outer neck wall comprises a second height, wherein the first height may be greater than the second height.

The neck portion comprises an angled collar on the outer neck wall; and a top wall connected to the angled collar and the inner neck wall. The lip portion comprises an angled upper surface such that a thickness of an end of the lip portion may be less than a thickness of a junction of the lip portion with the wheel housing. The assembly further comprises a pair of interfaces configured at the connection of the first half wheel cover with the second half wheel cover. The plurality of tabs bridge the pair of interfaces. The pair of interfaces comprises a first interface and a second interface, and wherein the first interface and the second interface are oppositely positioned from one another. Each of the first half wheel cover and the second half wheel cover comprise a pair of tabs positioned on an inner surface of the middle portion and bridging the first interface. Each of the first half wheel cover and the second half wheel cover comprise a tab positioned on the inner surface of the middle portion and bridging the second interface. The pair of clips bridge the pair of interfaces. The wheel housing may be hollow. The neck portion may be offset from a centroid of the wheel housing.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
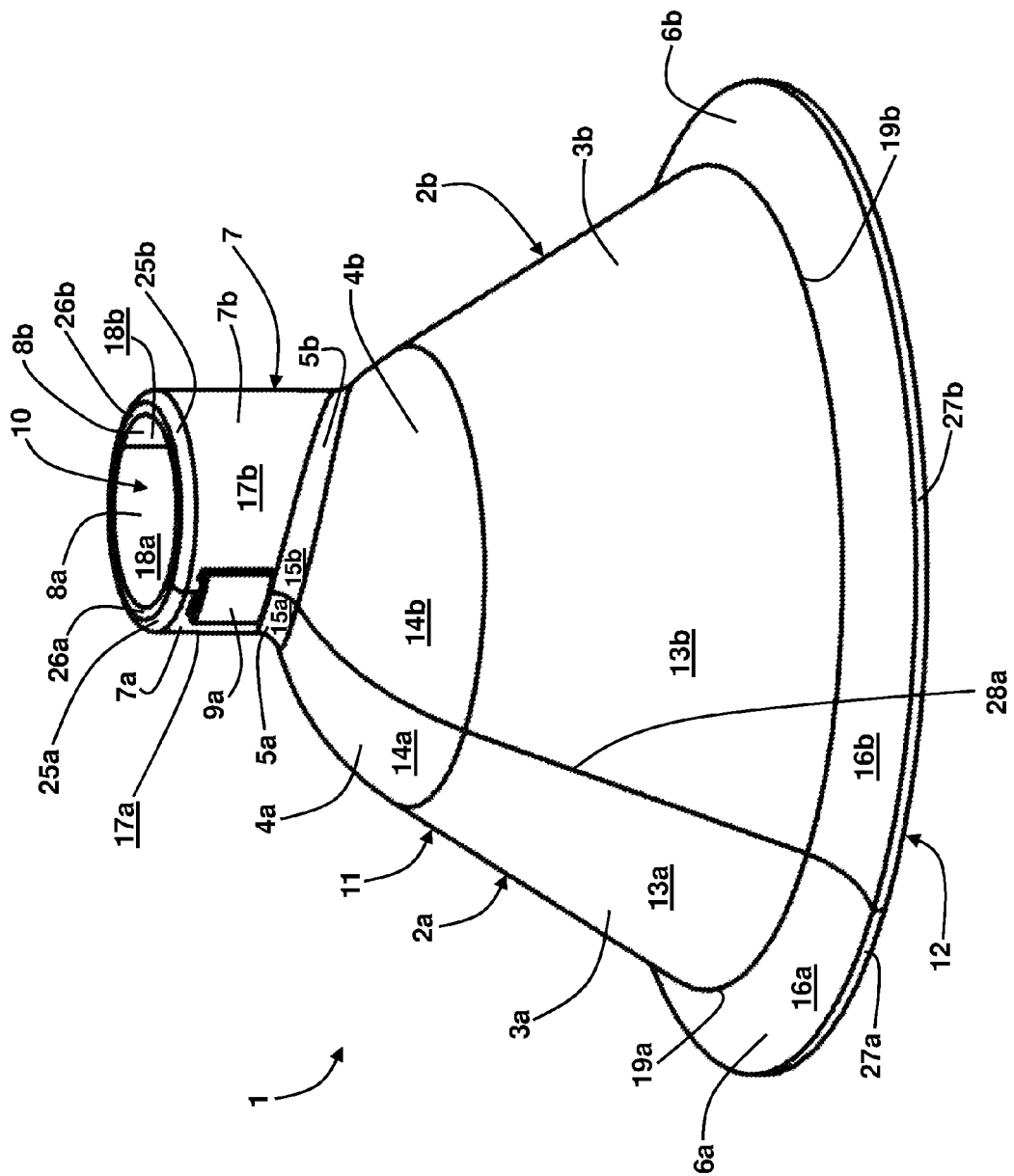
FIG. 1 illustrates a perspective view of a wheel cover assembly according to a first embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a wheel cover assembly that surrounds a wheel to allow the wheel to move freely without getting entangled by chords, wires, and other obstacles on the ground. Referring now to the drawings, and more particularly to FIGS. 1 through 17, where similar reference characters denote corresponding features consistently throughout the figures, there are shown preferred embodiments.

FIGS. 1 through 13 illustrate a first embodiment of a wheel cover assembly 1, which comprises a wheel housing 11 configured to house a wheel mechanism 30; a neck portion 7 upwardly extending from the wheel housing 11, wherein the neck portion 7 comprises a hollow channel 10 that extends into the wheel housing 11; a pair of clips 9a, 9b configured on the neck portion 7; and a lip portion 12 (e.g., first half lip 6a and second half lip 6b) extending from a lower portion (e.g., first half lower portion 3a and second half lower portion 3b) of the wheel housing 11. The first half lower portion 3a comprises an angled outer surface 13a, and the second half lower surface 3b comprises an angled outer surface 13b. The wheel housing 11 comprises a first half wheel cover 2a; a second half wheel cover 2b; and a plurality of tabs 21a, 21b, 21c, 22a, 22b, 22c selectively connected to each of the first half wheel cover 2a and the second half wheel cover 2b, wherein the plurality of tabs 21a, 21b, 21c, 22a, 22b, 22c selectively align together upon connection of the first half wheel cover 2a with the second half wheel cover 2b. Each of the first half wheel cover 2a and the second half wheel cover 2b comprise one half of the neck portion 7, wherein each half of the neck portion 7 comprises a clip (e.g., first clip 9a or second clip 9b); a stop 29a or 29b configured at an end of the clip 9a or 9b; and a catch 23a, 23b configured to engage the stop 29a or 29b, wherein upon connection of the first half wheel cover 2a with the second half wheel cover 2b, the each half of the neck portion 7 aligns and locks together to form the neck portion 7 comprising the hollow channel 10, wherein engagement of the catch 23a, 23b with the stop 29a, 29b, respectively, locks the neck portion 7 and the wheel housing 11.

Figure 13:
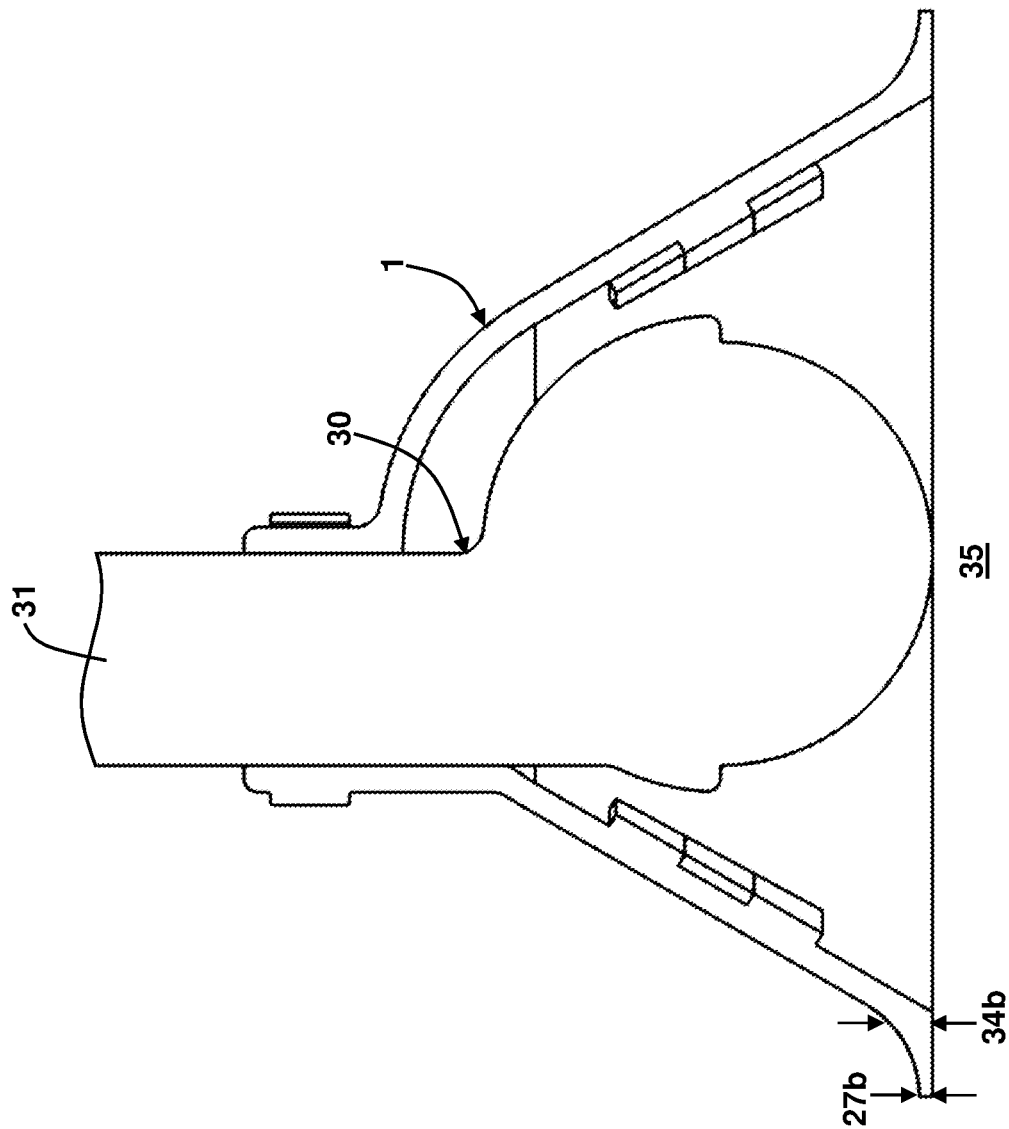
FIG. 13 illustrates a cross-sectional left side view of the wheel mechanism and wheel cover assembly of FIG. 11 according to a first embodiment herein.
Figure 17:
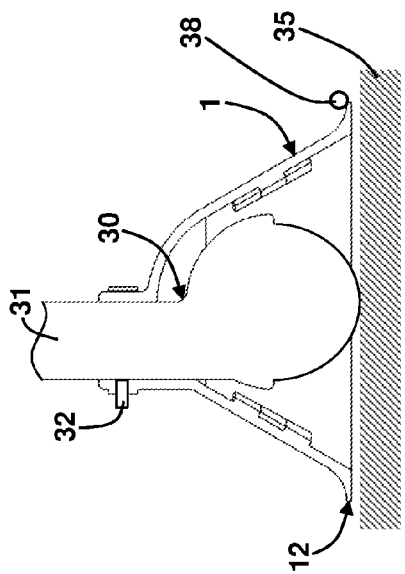
FIG. 17 illustrates a cross-sectional left side view of the wheel mechanism and wheel cover assembly of FIG. 14 in a raised configuration according to a second embodiment herein.

The hollow channel 10 of the neck portion 7 is configured to permit a wheel stem 31 of the wheel mechanism 30 to extend therethrough. In one embodiment shown in FIGS. 14 through 17, the neck portion 7 comprises a lock 32 configured to retain the neck portion 7 against the wheel stem 31. In one embodiment, the lip portion 12 (e.g., first half lip 6a and second half lip 6b) comprises a bottom surface 33a, 33b, respectively, that rests against an underlying floor 35 as shown in FIGS. 13 and 16. In another embodiment, the lip portion 12 is spaced apart from an underlying floor 35 as shown in FIG. 17. In this embodiment, the neck portion 7 is not tightly fit around the wheel stem 31, which allows for the wheel cover assembly 1 to be raised to a desired height above the underlying floor 35. In one embodiment, the lock 32, which may be configured as a screw that can be tightened against the wheel stem 31 to lock the neck portion 7 against the wheel stem 31 at a desired height, allows the wheel cover assembly 1 to be raised above the underlying floor 35 as shown in FIG. 17.

The wheel housing 11 comprises a lower portion (e.g., first half lower portion 3a and second half lower portion 3b) connected to the lip portion 12; a middle portion (e.g., first half middle portion 4a and second half middle portion 4b) connected to the lower portion (e.g., first half lower portion 3a and second half lower portion 3b); and an upper portion (e.g., first half upper portion 5a and second half upper portion 5b) connected to the middle portion (e.g., first half middle portion 4a and second half middle portion 4b) and the neck portion 7. The first half middle portion 4a comprises a curved outer surface 14a, and the second half middle portion 4b comprises a curved outer surface 14b. The first half upper portion 5a comprises an angled outer surface 15a and an angled inner surface 24a, and the second half upper portion 5b comprises an angled outer surface 15b and an angled inner surface 24b. The neck portion 7 comprises a first half inner neck wall 8a and a second half inner neck wall 8b configured to define the thickness of the hollow channel 10; and a first half outer neck wall 7a and a second half out neck wall 7b, wherein the pair of clips 9a, 9b extend from the outer neck wall 7a, 7b. The first half outer neck wall 7a comprises a curved outer surface 17a, and the second half outer neck wall 7b comprises a curved outer surface 17b. Moreover, the first half inner neck wall 8a comprises a curved surface 18a, and the second half inner neck wall 8b comprises a curved surface 18b.

As shown in FIGS. 5 through 8, a first side of the outer neck wall 7a, 7b comprises a first height 36a, and a second side of the outer neck wall 7a, 7b comprises a second height 36b, wherein the first height 36a is greater than the second height 36b. The neck portion 7 comprises an angled collar (e.g., first half collar 25a and second half collar 25b) on the outer neck wall 7a, 7b; and a top wall (e.g., first half top wall 26a and second half top wall 26b) connected to the angled collar 25a, 25b and the inner neck wall 8a, 8b. The lip portion 12 comprises an angled upper surface 16a, 16b such that a thickness 27a, 27b of an end of the lip portion 12 is less than a thickness 34a, 34b of a junction (e.g., first half junction 19a and second half junction 19b) of the lip portion 12 with the wheel housing 11.

Figure 3:
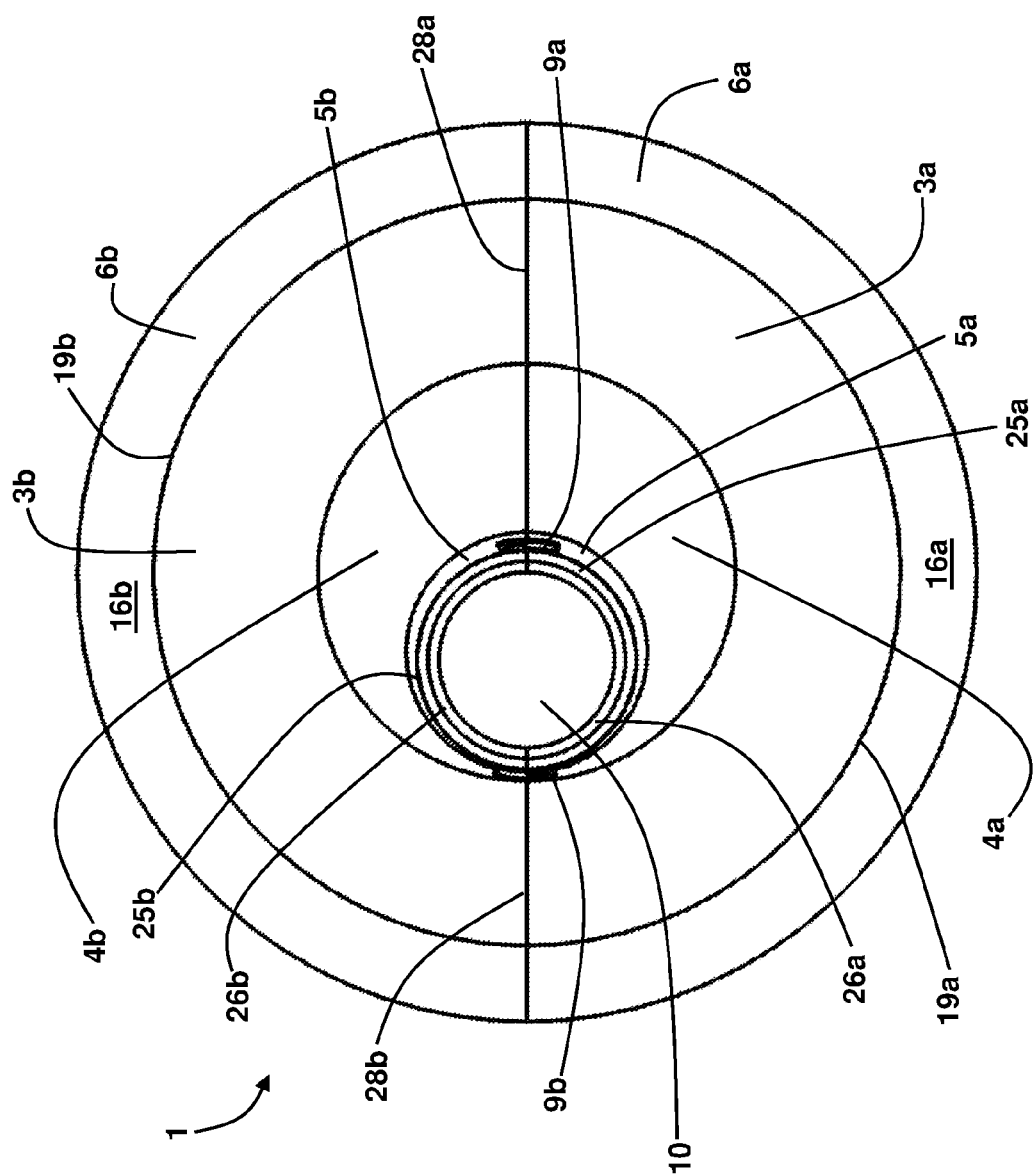
FIG. 3 illustrates a top view of the wheel cover assembly of FIG. 1 according to a first embodiment herein.
Figure 4:
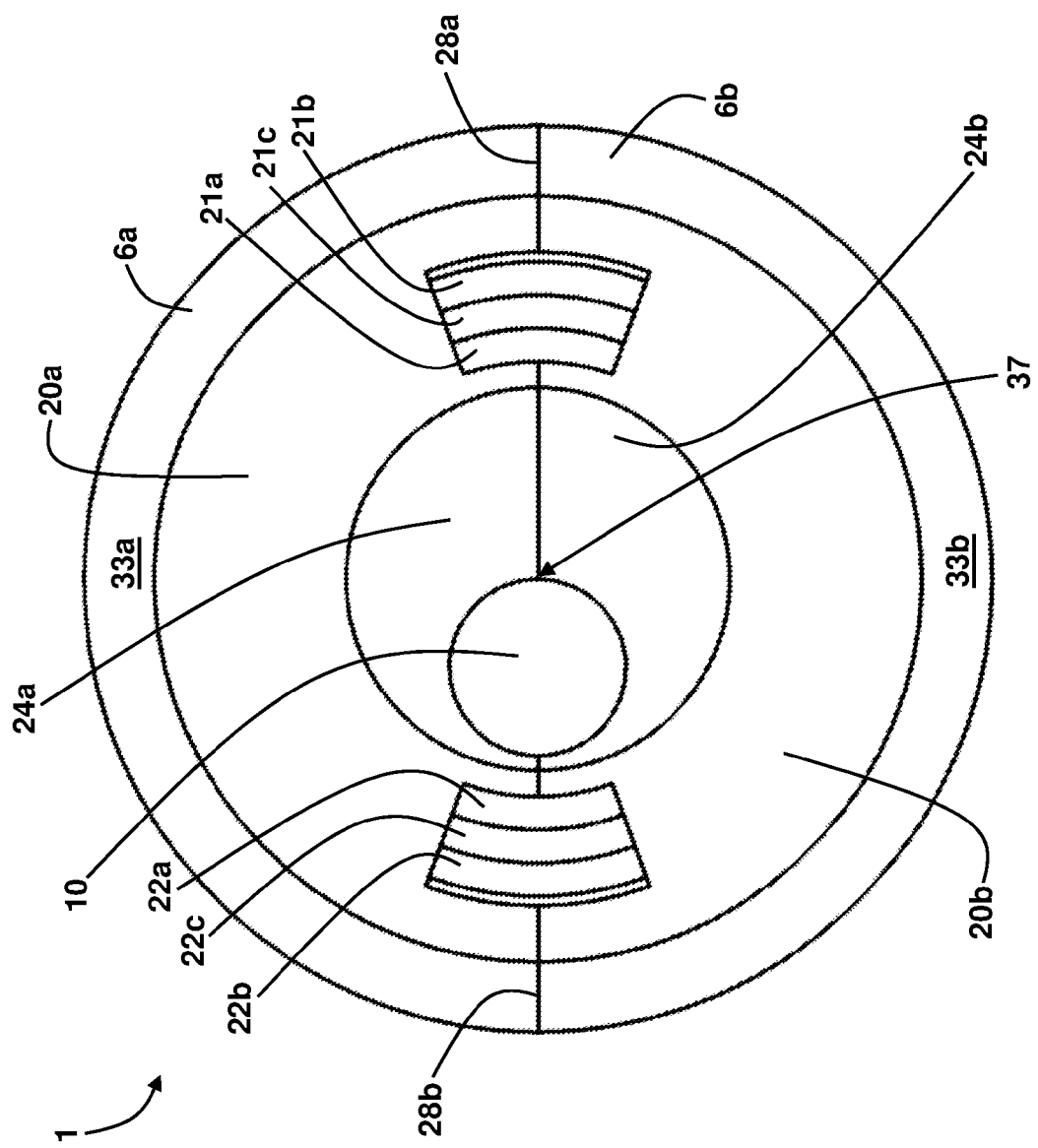
FIG. 4 illustrates a bottom view of the wheel cover assembly of FIG. 1 according to a first embodiment herein.
Figure 5:
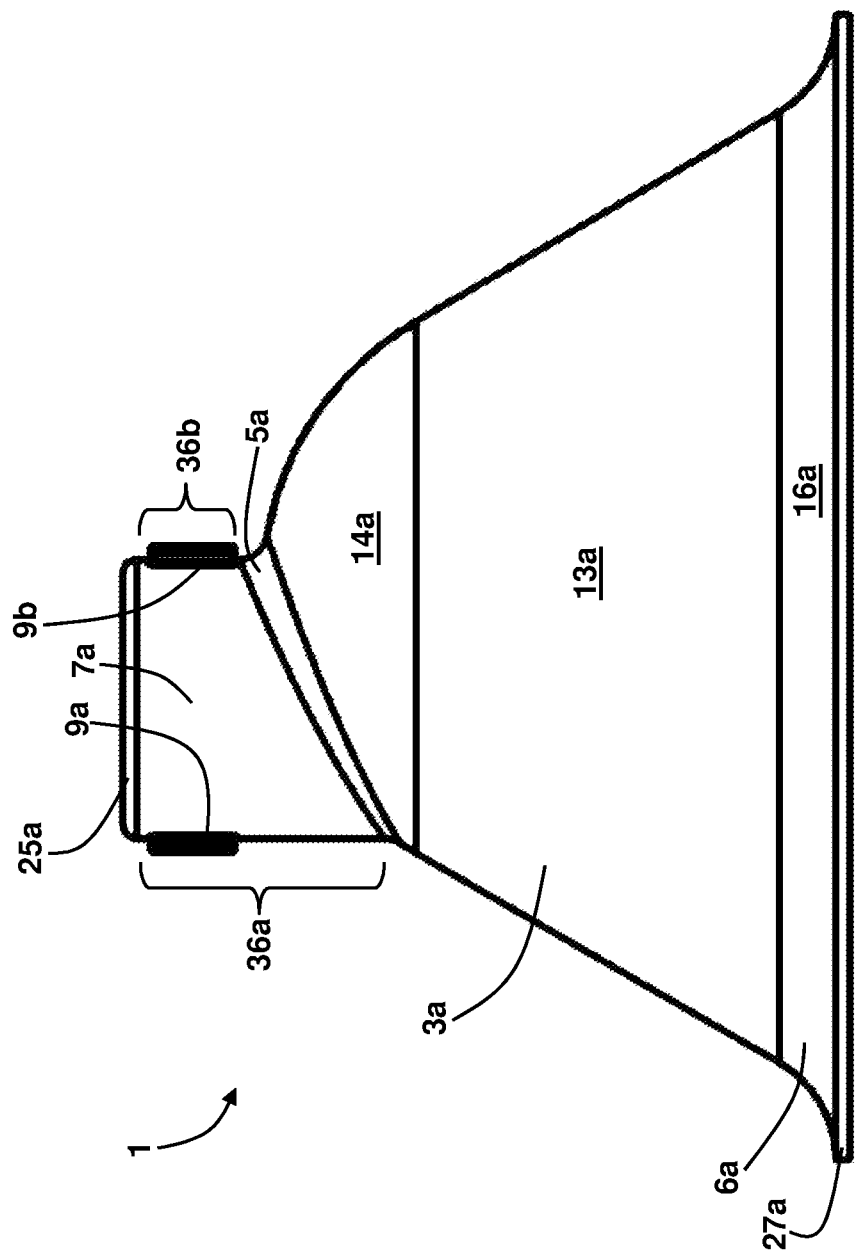
FIG. 5 illustrates a left side view of the wheel cover assembly of FIG. 1 according to a first embodiment herein.
Figure 6:
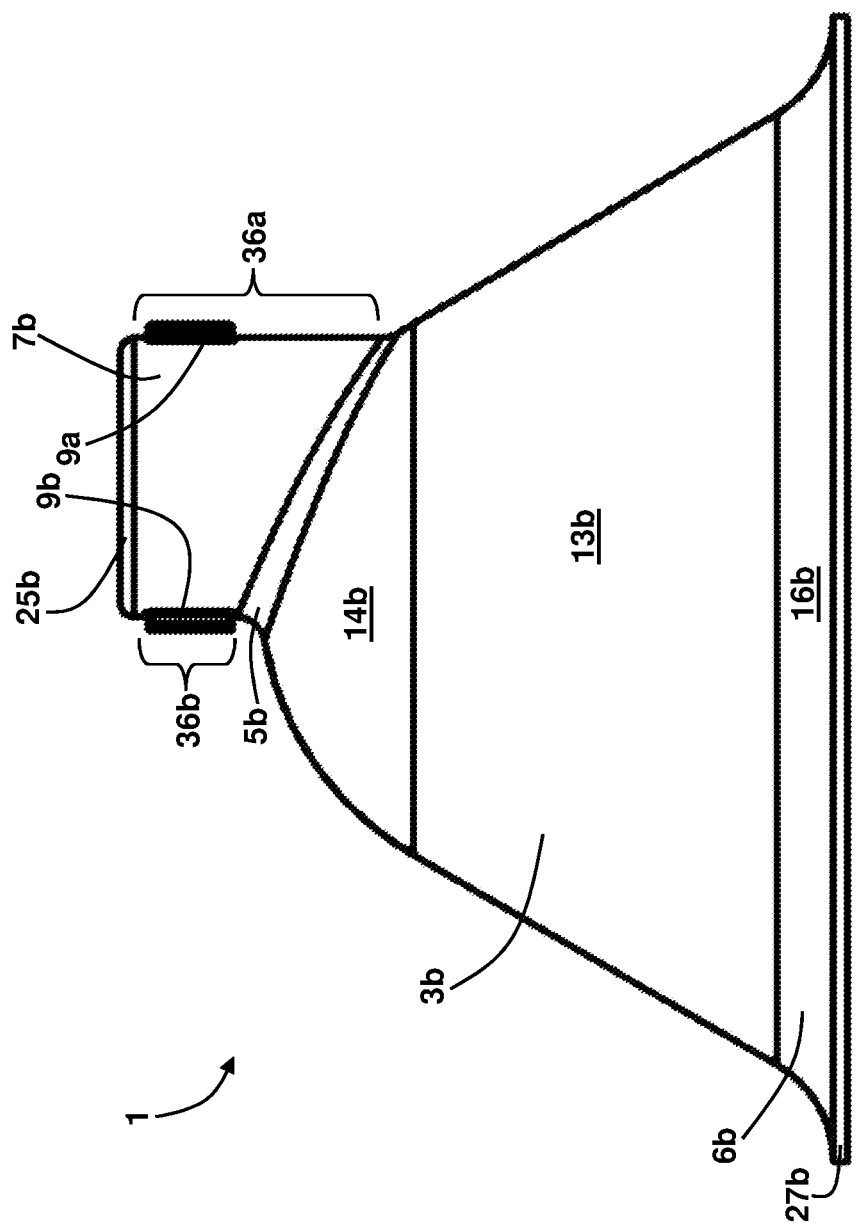
FIG. 6 illustrates a right side view of the wheel cover assembly of FIG. 1 according to a first embodiment herein.
Figure 7:
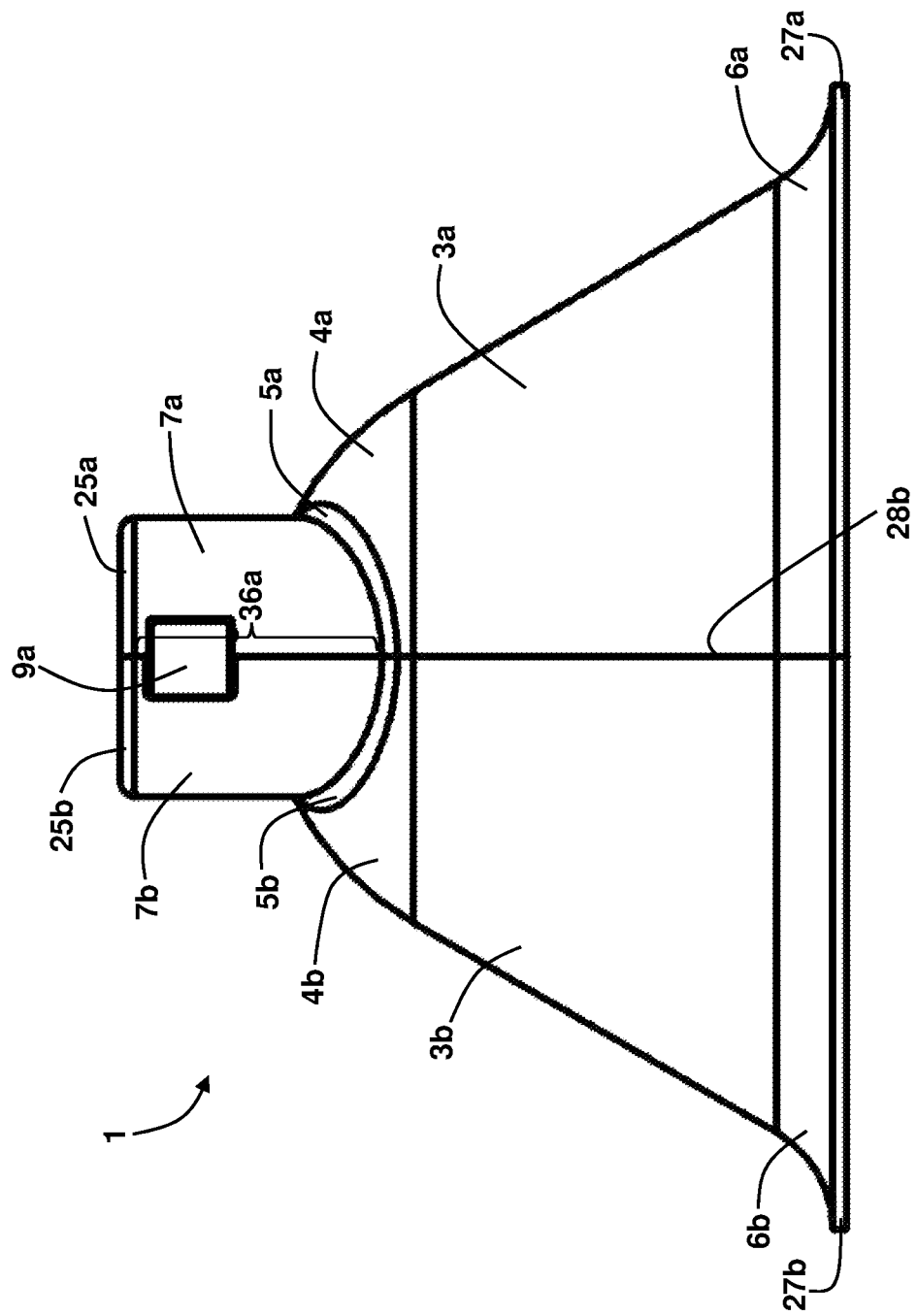
FIG. 7 illustrates a rear view of the wheel cover assembly of FIG. 1 according to a first embodiment herein.
Figure 8:
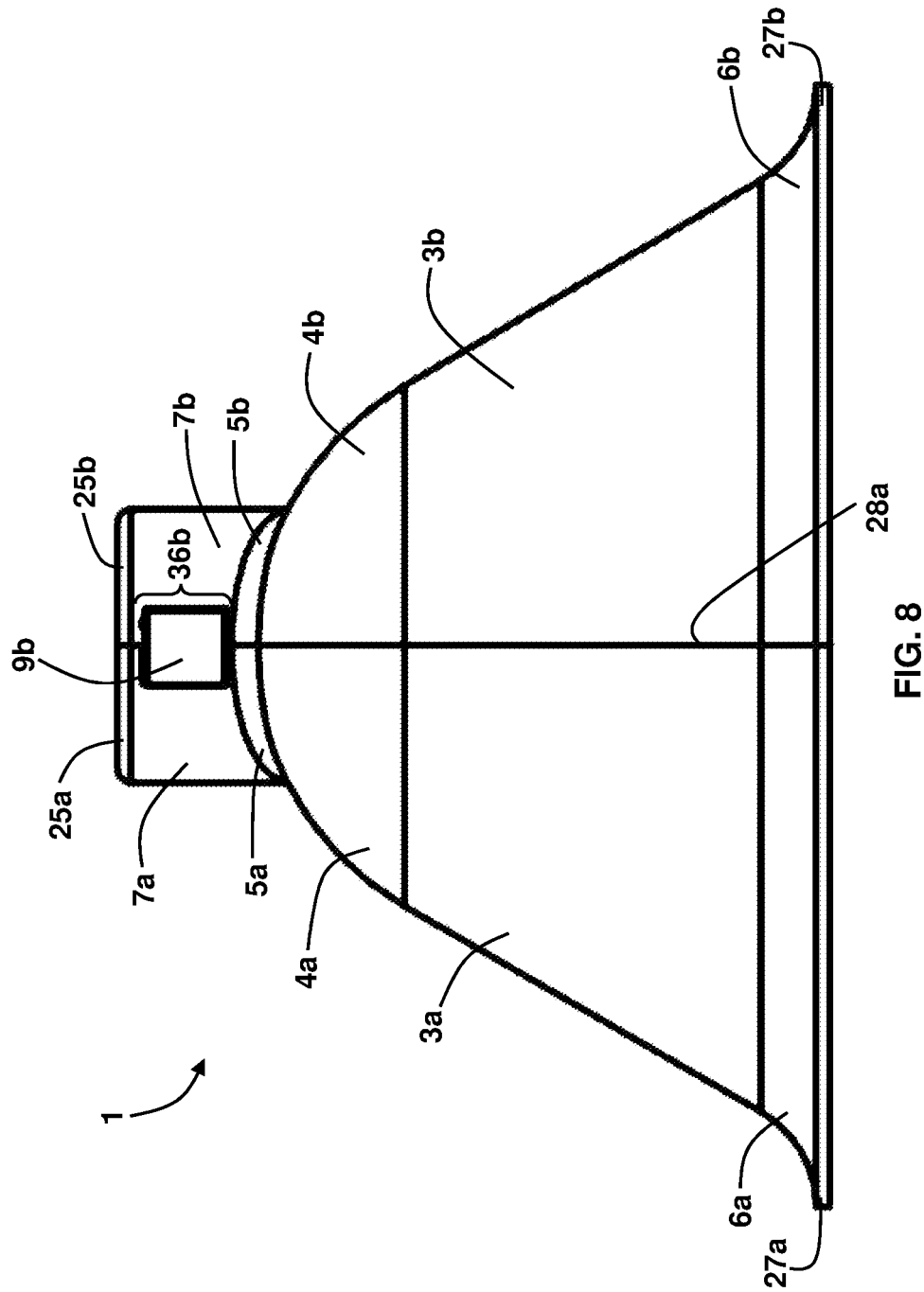
FIG. 8 illustrates a front view of the wheel cover assembly of FIG. 1 according to a first embodiment herein.

The assembly 1 further comprises a pair of interfaces (e.g., first interface 28a and second interface 28b) configured at the connection of the first half wheel cover 2a with the second half wheel cover 2b. The plurality of tabs 21a, 21b, 21c, 22a, 22b, 22c bridge the pair of interfaces 28a, 28b. The pair of interfaces 28a, 28b comprises a first interface 28a and a second interface 28b, and wherein the first interface 28a and the second interface 28b are oppositely positioned from one another. Given the contour of the wheel housing 11, the first interface 28a is longer than the second interface 28b as shown in FIG. 3. Each of the first half wheel cover 2a and the second half wheel cover 2b comprise a pair of tabs 21a, 21b, or 22a, 22b, respectively, positioned on an inner surface 20a, 20b of the middle portion 4a, 4b and bridging the first interface 28a. Each of the first half wheel cover 2a and the second half wheel cover 2b comprise a tab 21c or 22c positioned on the inner surface 20a, 20b of the middle portion 4a, 4b and bridging the second interface 28b. The pair of clips 9a, 9b bridge the pair of interfaces 28a, 28b. Preferably, the wheel housing 11 is hollow to comfortably accommodate the wheel mechanism 30. In one embodiment, the neck portion 7 is offset from a centroid 37 of the wheel housing 11 as shown in FIG. 4.

Figure 2:
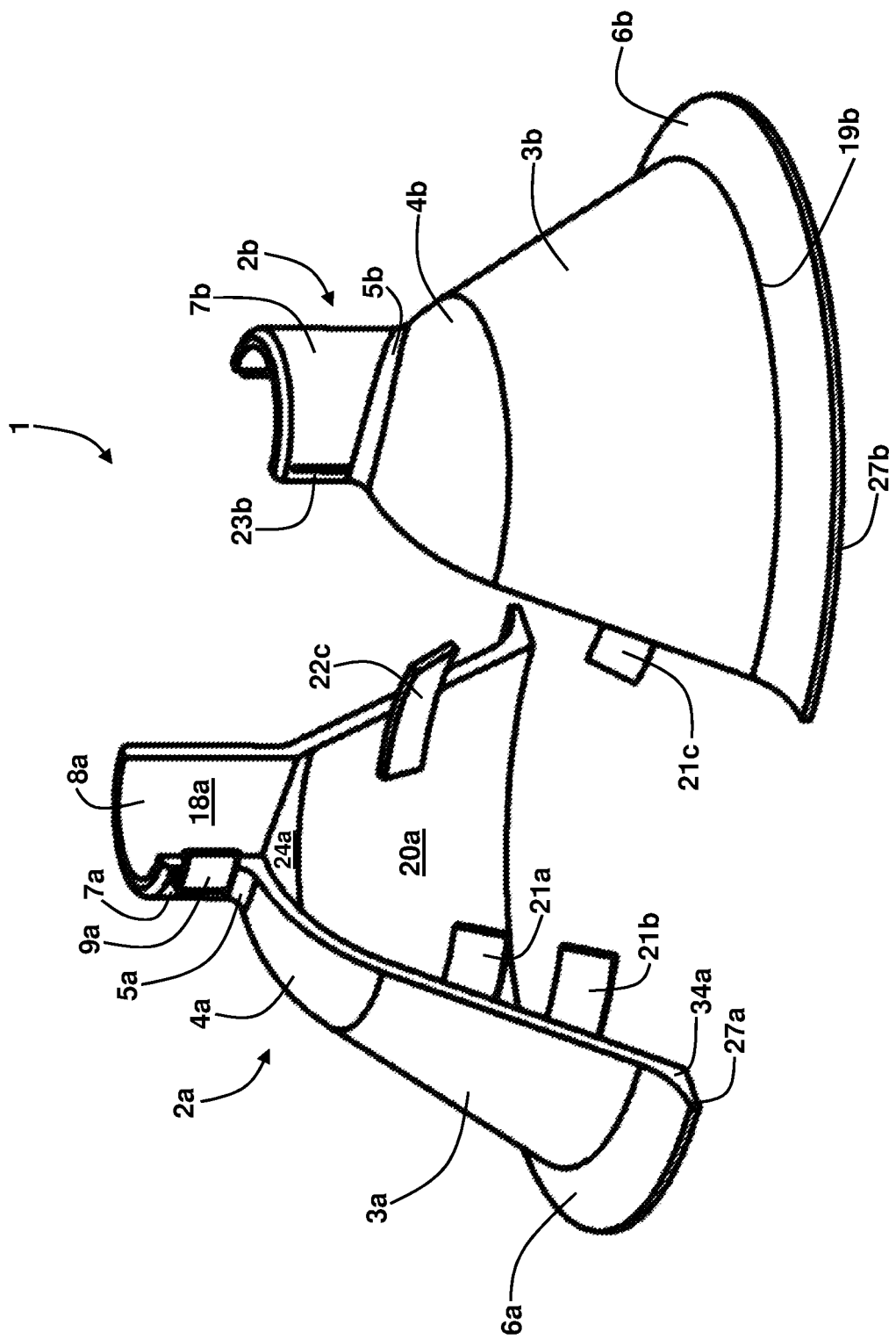
FIG. 2 illustrates an exploded perspective view of the wheel cover assembly of FIG. 1 according to a first embodiment herein.
Figure 9:
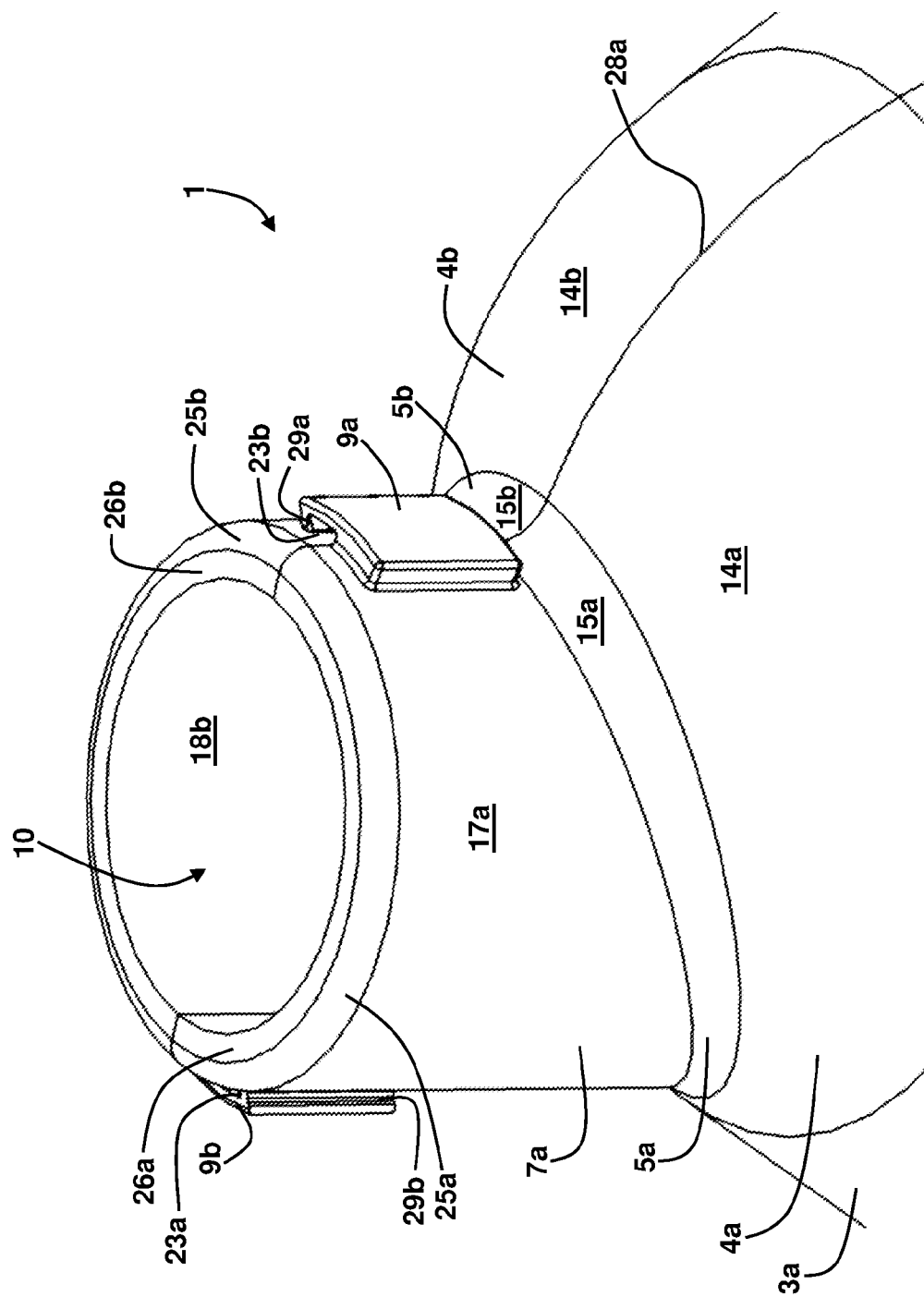
FIG. 9 illustrates a magnified view of the wheel cover assembly of FIG. 1 according to a first embodiment herein.
Figure 10:
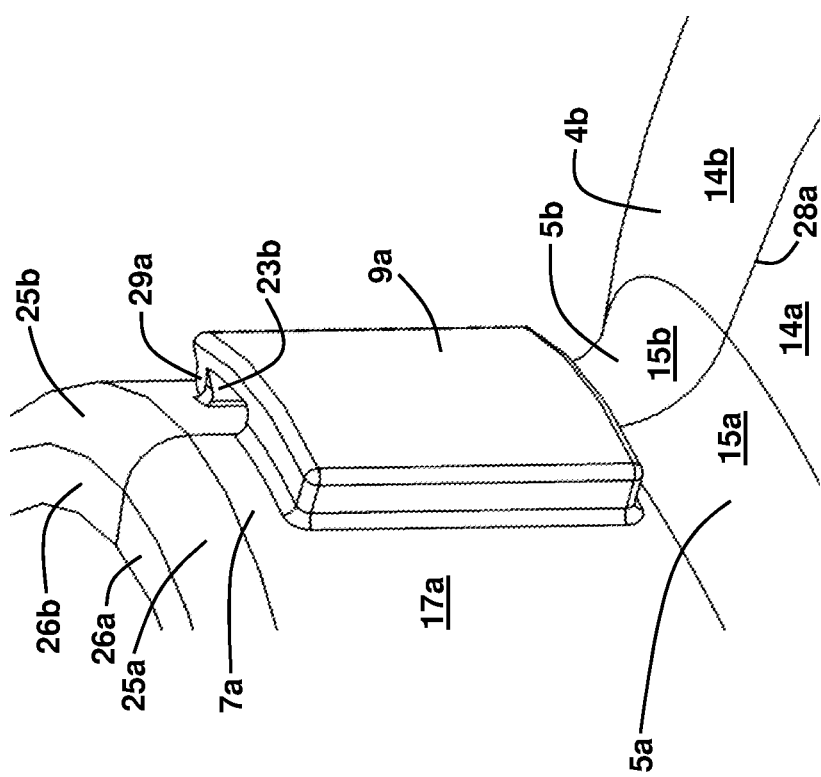
FIG. 10 illustrates a magnified view of the illustrating the clip of the wheel cover assembly of FIG. 1 according to a first embodiment herein.
Figure 11:
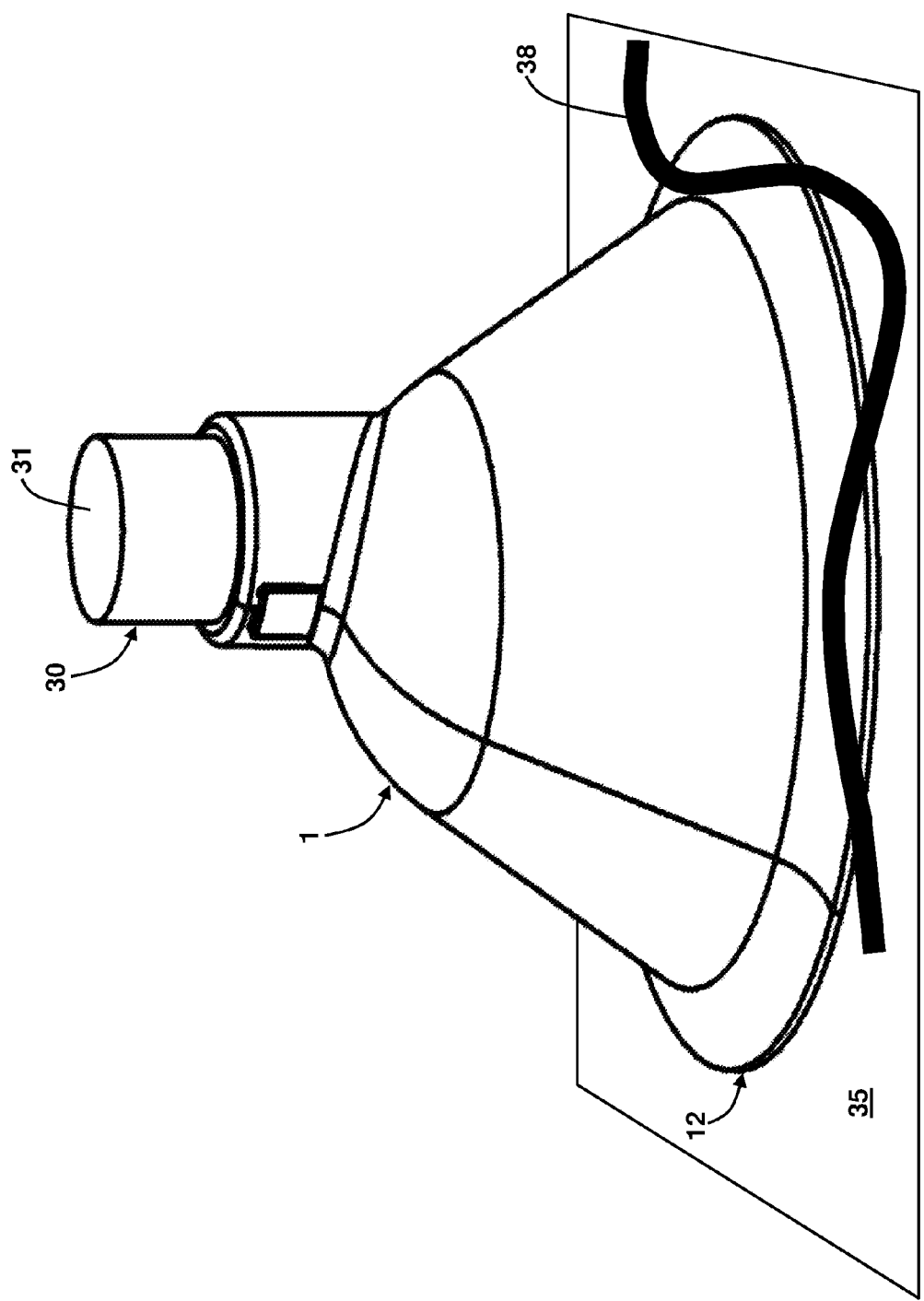
FIG. 11 illustrates a perspective view of a wheel mechanism inserted in the wheel cover assembly of FIG. 1 according to a first embodiment herein.
Figure 12:
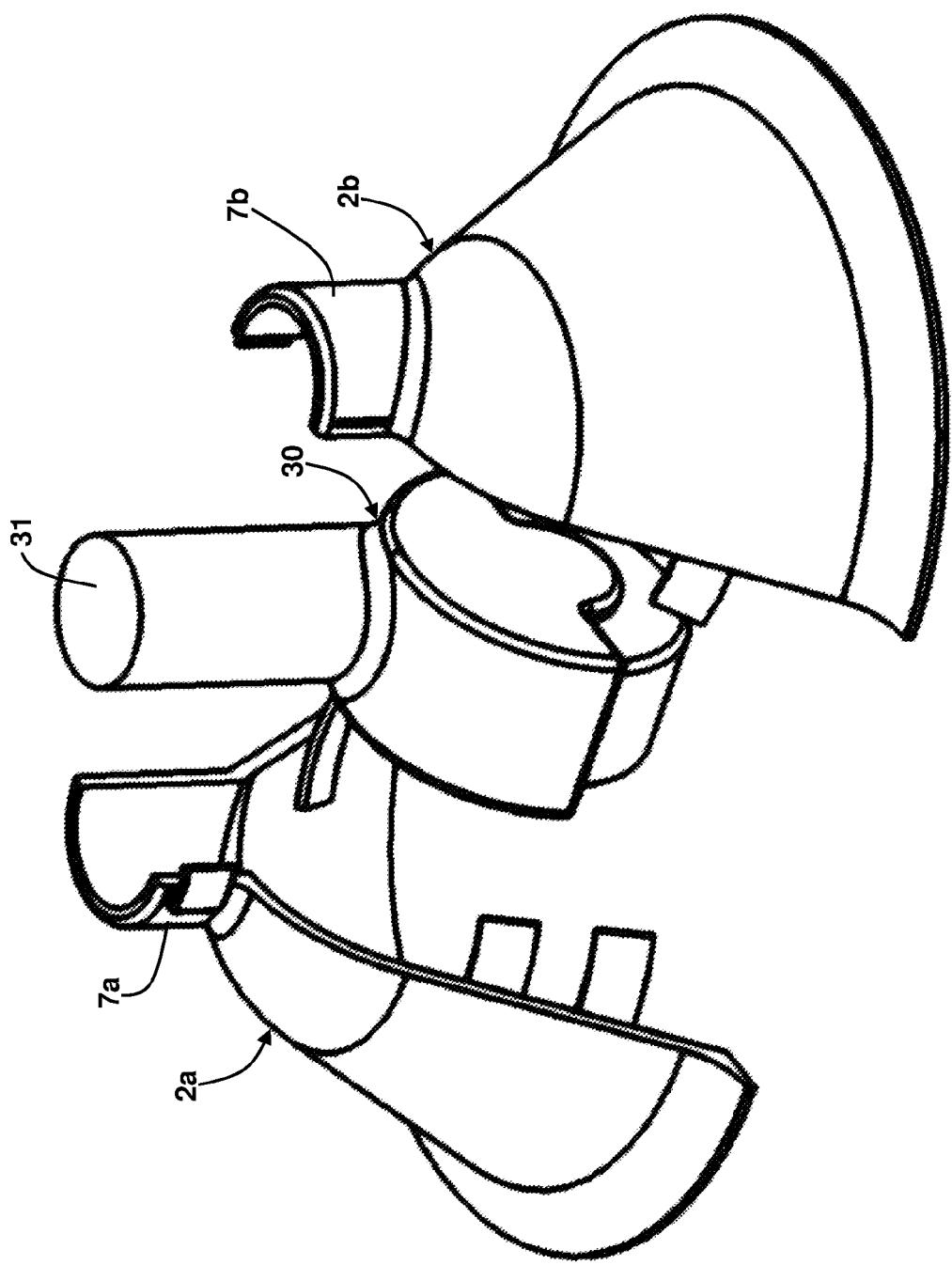
FIG. 12 illustrates an exploded perspective view of the wheel mechanism and wheel cover assembly of FIG. 11 according to a first embodiment herein.

The wheel cover assembly 1 is configured as two complementary pairs (e.g., first half wheel cover 2a and second half wheel cover 2b) as shown in FIG. 2, and is configured to be connected together as shown in FIG. 1. In operation, the first half wheel cover 2a and the second half wheel cover 2b are placed on either side of the wheel mechanism 30 as shown in FIG. 12 with the wheel step 31 placed in between the first half outer neck wall 7a and the second half out neck wall 7b. The first half wheel cover 2a and the second half wheel cover 2b are pressed together such that the tabs 21a, 21b align with tab 21c, and tabs 22a, 22b align with tab 22c as shown in FIG. 4. Next, the first clip 9a engages catch 23b by snapping stop 29a against catch 23b, and the second lip 9b engages catch 23a by snapping stop 29b against catch 23a as shown in FIGS. 9 and 10. The assembled wheel cover assembly 1 thereafter encloses the sides of the wheel mechanism 30. Upon movement of an object (e.g., bed, chair, shelf, etc. (not shown)) connected to the wheel mechanism 30, the wheel mechanism 30 moves across the underlying floor 35, and upon contacting an obstacle such as a cord 38, as shown in FIG. 11, the lip portion 12 prevents the cord 38 from becoming entangled with the wheel mechanism 30 or otherwise coming into contact with or being run over by the wheel mechanism 30. The angled upper surface 16a, 16b of the lip portion 12 helps ensure that the cord 38 is pushed upwards towards the first half junction 19a and second half junction 19b of the wheel housing 11 as opposed to underneath the wheel housing 11, and thereby preventing entanglement with the wheel mechanism 30.

Figure 15:
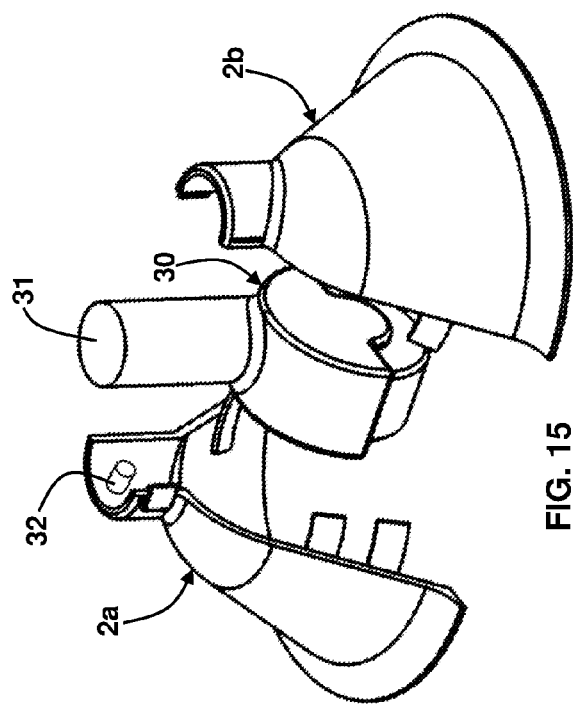
FIG. 15 illustrates an exploded perspective view of the wheel mechanism and wheel cover assembly of FIG. 14 according to a second embodiment herein.
Figure 14:
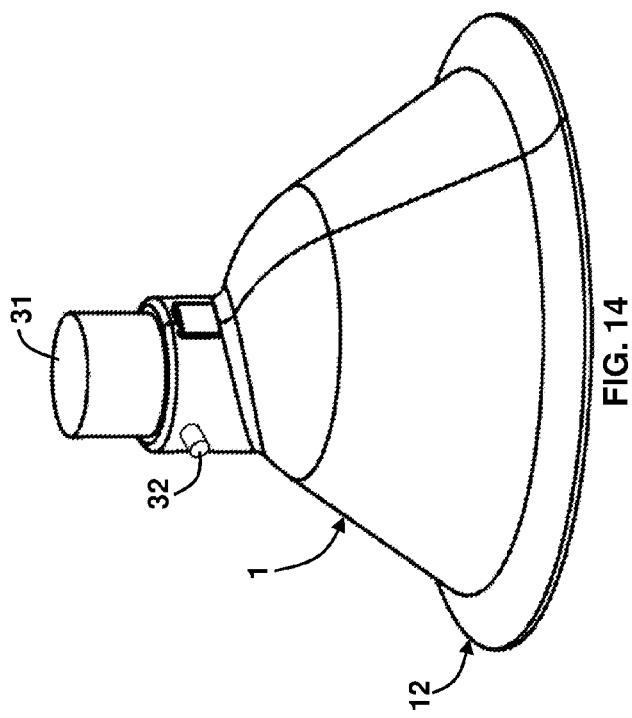
FIG. 14 illustrates a perspective view of a wheel mechanism inserted in a wheel cover assembly according to a second embodiment herein.
Figure 16:
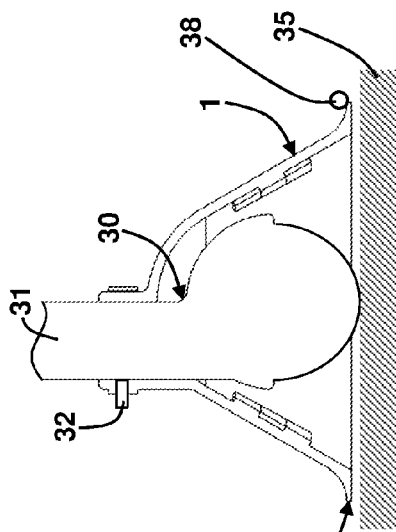
FIG. 16 illustrates a cross-sectional left side view of the wheel mechanism and wheel cover assembly of FIG. 14 according to a second embodiment herein.

In the event it is desired to raise the level of the wheel cover assembly 1 such that it does not sit flush against the underlying floor 35, as shown in FIG. 17, then after the first half wheel cover 2a and the second half wheel cover 2b are placed on either side of the wheel mechanism 30 as shown in FIG. 15, the wheel cover assembly 1 is raised to its desired level and the lock 32 is pressed against the wheel stem 31 as shown in FIG. 17. The embodiment shown in FIG. 17 with the raised wheel cover assembly 1 may be desired to prevent the wheel cover assembly 1 from scraping against the underlying floor 35 or if the underlying floor 35 comprises an uneven surface (i.e., a shag carpet, etc.), then raising the wheel cover assembly 1 slightly above the underlying floor 35 may allow the wheel mechanism 30 to more freely move without hindrance of the wheel cover assembly 1 being caught by uneven portions of the underlying floor 35. However, the raised height of the wheel cover assembly 1 is selected to prevent a cord 38 from coming underneath the lip portion 12 (i.e., the raised height is less than the thickness of a cord, etc.).

The lock 32 can also be utilized, if desired, when the wheel cover assembly 1 is used flushed against the underlying floor 35 as shown in FIG. 16. Such a configuration may be desired to keep the wheel cover assembly 1 held tightly against the wheel stem 31. Accordingly, the wheel cover assembly 1 may be utilized with any thickness/diameter of wheel stem 31 since the lock 32 can be pressed against the wheel stem 31 to keep it tightly held against the assembly 1. However, even if the wheel stem 31 is not held tightly against the assembly 1, the assembly 1 can still perform its function of keeping obstacles (e.g., cord 38) from coming into contact with the wheel mechanism 30 since the assembly 1 moves with the wheel mechanism 30 even if the assembly 1 is loosely fit around the wheel stem 31.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A wheel cover assembly comprising:
   a wheel housing configured to house a wheel mechanism, wherein said wheel housing comprises:
      a first half wheel cover;
      a second half wheel cover; and
      a plurality of tabs connected to each of said first half wheel cover and said second half wheel cover, wherein said plurality of tabs selectively align together upon connection of said first half wheel cover with said second half wheel cover;
   a neck portion upwardly extending from said wheel housing, wherein said neck portion comprises a hollow channel that extends into said wheel housing;
   a pair of clips configured on said neck portion; and
   a lip portion extending from a lower portion of said wheel housing.

2. The assembly of claim 1, wherein each of said first half wheel cover and said second half wheel cover comprise one half of said neck portion, wherein each half of said neck portion comprises:
   a clip;
   a stop configured at an end of said clip; and
   a catch configured to engage said stop,
   wherein upon connection of said first half wheel cover with said second half wheel cover, said each half of said neck portion aligns and locks together to form said neck portion comprising said hollow channel, wherein engagement of said catch with said stop locks said neck portion and said wheel housing.

3. The assembly of claim 1, wherein said hollow channel of said neck portion is configured to permit a wheel stem of said wheel mechanism to extend therethrough.

4. The assembly of claim 1, wherein said lip portion comprises a bottom surface that rests against an underlying surface.

5. The assembly of claim 1, wherein said lip portion is spaced apart from an underlying surface.

6. The assembly of claim 1, wherein said wheel housing comprises:
a lower portion connected to said lip portion;
a middle portion connected to said lower portion; and
an upper portion connected to said middle portion and said neck portion.

7. The assembly of claim 6, further comprising a pair of interfaces configured at said connection of said first half wheel cover with said second half wheel cover.

8. The assembly of claim 7, wherein said plurality of tabs bridge said pair of interfaces.

9. The assembly of claim 7, wherein said pair of interfaces comprises a first interface and a second interface, and wherein said first interface and said second interface are oppositely positioned from one another.

10. The assembly of claim 9, wherein each of said first half wheel cover and said second half wheel cover comprise a pair of tabs positioned on an inner surface of said middle portion and bridging said first interface.

11. The assembly of claim 9, wherein each of said first half wheel cover and said second half wheel cover comprise a tab positioned on said inner surface of said middle portion and bridging said second interface.

12. The assembly of claim 7, wherein said pair of clips bridge said pair of interfaces.

13. The assembly of claim 1, wherein said lip portion comprises an angled upper surface such that a thickness of an end of said lip portion is less than a thickness of a junction of said lip portion with said wheel housing.

14. The assembly of claim 1, wherein said wheel housing is hollow.

15. The assembly of claim 1, wherein said neck portion is offset from a centroid of said wheel housing.

16. A wheel cover assembly comprising:
a wheel housing configured to house a wheel mechanism;
a neck portion upwardly extending from said wheel housing, wherein said neck portion comprises a hollow channel that extends into said wheel housing, wherein said hollow channel of said neck portion is configured to permit a wheel stem of said wheel mechanism to extend therethrough, and wherein said neck portion comprises a lock configured to retain said neck portion against said wheel stem;
a pair of clips configured on said neck portion; and
a lip portion extending from a lower portion of said wheel housing.

17. The assembly of claim 16, wherein said lock comprises a screw.

18. A wheel cover assembly comprising:
a wheel housing configured to house a wheel mechanism;
a neck portion upwardly extending from said wheel housing, wherein said neck portion comprises:
a hollow channel that extends into said wheel housing;
an inner neck wall configured to define the thickness of said hollow channel; and
an outer neck wall;
a pair of clips configured on said neck portion, wherein said pair of clips extend from said outer neck wall; and
a lip portion extending from a lower portion of said wheel housing.

19. The assembly of claim 18, wherein a first side of said outer neck wall comprises a first height, wherein a second side of said outer neck wall comprises a second height, and wherein said first height is greater than said second height.

20. The assembly of claim 18, wherein said neck portion comprises:
an angled collar on said outer neck wall; and
a top wall connected to said angled collar and said inner neck wall.

* * * * *